(12) United States Patent
Lehmann et al.

(10) Patent No.: US 10,060,764 B2
(45) Date of Patent: Aug. 28, 2018

(54) INDUCTIVE POSITION SENSOR WITH FREQUENCY CONVERTER AND GOERTZEL FILTER FOR ANALYZING SIGNALS

(71) Applicant: Continental Teves AG & Co. oHG, Frankfurt (DE)

(72) Inventors: Sören Lehmann, Frankfurt (DE); Andreas Schirling, Darmstadt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 15/505,386

(22) PCT Filed: Sep. 22, 2015

(86) PCT No.: PCT/EP2015/071701
§ 371 (c)(1),
(2) Date: Feb. 21, 2017

(87) PCT Pub. No.: WO2016/046191
PCT Pub. Date: Mar. 31, 2016

(65) Prior Publication Data
US 2017/0268907 A1    Sep. 21, 2017

(30) Foreign Application Priority Data
Sep. 22, 2014   (DE) ................ 10 2014 219 092

(51) Int. Cl.
*H01F 5/00*   (2006.01)
*G01D 5/22*   (2006.01)
(Continued)

(52) U.S. Cl.
CPC ............ *G01D 5/2291* (2013.01); *G01C 1/00* (2013.01); *G06F 2101/00* (2013.01); *H01L 21/00* (2013.01); *H01L 2221/00* (2013.01)

(58) Field of Classification Search
CPC ....... H01L 21/00; H01L 2221/00; H03H 1/00; H03H 2210/00; G06F 1/00; G06F 2101/00; H01F 1/00; G01C 1/00
See application file for complete search history.

(56) References Cited

U.S. PATENT DOCUMENTS 5,818,296 A    10/1998  Lee et al.
6,031,350 A *   2/2000  Sidey ................... G05B 19/311
                                                           318/599
(Continued)

FOREIGN PATENT DOCUMENTS

DE    102012215940 A1    3/2013
EP         2552070 A2    1/2013
JP      2003198366 A     7/2003

OTHER PUBLICATIONS

International Search Report and Written Opinion for International Application No. PCT/EP2015/071701, dated Dec. 23, 2015, 10 pages.

(Continued)

*Primary Examiner* — Jermele M Hollington
*Assistant Examiner* — Temilade Rhodes-Vivour
(74) *Attorney, Agent, or Firm* — RatnerPrestia

(57) ABSTRACT

A position sensor connected to first and second electric signal sources to output a first electric signal with a first frequency and a second electric signal with a second frequency. The position sensor includes: a primary coil generating a magnetic alternating field with the first frequency; a first and a second secondary coil, the first and second secondary coils each magnetically coupled to the primary coil by the position transmitter, and third and fourth electric signals induced in the first and second secondary coils respectively by the generated magnetic alternating field; a frequency converter converts the third and fourth electric signals into respective first and second intermediate fre- (Continued)

quency signals, the frequency converter connectable to the second electric signal source. A Goertzel filter bank demodulates the first intermediate frequency signal to obtain a first demodulated signal and demodulates the second intermediate frequency signal to obtain a second demodulated signal.

18 Claims, 10 Drawing Sheets

(51) Int. Cl.
*G01C 1/00* (2006.01)
*H01L 21/00* (2006.01)

(56) References Cited

U.S. PATENT DOCUMENTS

| | | | |
|---|---|---|---|
| 6,828,863 B2 | 12/2004 | Itkin et al. | |
| 9,243,933 B2 | 1/2016 | Lehmann et al. | |
| 2008/0116883 A1* | 5/2008 | Ruehl | G01D 5/2093 324/207.17 |
| 2015/0035519 A1* | 2/2015 | Buelau | G01D 5/2291 324/207.18 |

OTHER PUBLICATIONS

German Search Report for German Application No. 10 2014 219 092.4, dated Jul. 27, 2015, including partial English translation, 8 pages.

Christoph Rauscher et al., "Basics of spectrum analysis", Jan. 1, 2000, Retrieved from the internet: http://www.heuermann.fh-aachen.de/files/download/diverse/Spektrumanalyse.pdf [retrieved on Dec. 8, 2015], with machine translation, 7 pages.

Haderer, A., et al., "A fixed IF 77-GHz FMCW radar sensor," Microwave Conference, 2008, APMC 2008, Asia-Pacific, IEEE, Piscataway, NJ, Dec. 16, 2008, pp. 1-4, XP031636803, ISBN: 978-1-4244-2641-6.

Korean Notice of Grounds for Rejection for Korean Application No. 10-2017-7007406, dated May 17, 2018 with translation, 12 pages.

\* cited by examiner

INDUCTIVE POSITION SENSOR WITH FREQUENCY CONVERTER AND GOERTZEL FILTER FOR ANALYZING SIGNALS

CROSS REFERENCE TO RELATED APPLICATIONS

This application is the U.S. National Phase Application of PCT International Application No. PCT/EP2015/071701, filed Sep. 22, 2015, which claims priority to German Patent Application No. 10 2014 219 092.4, filed Sep. 22, 2014, the contents of such applications being incorporated by reference herein.

FIELD OF THE INVENTION

The invention at hand relates to a position sensor.

BACKGROUND OF THE INVENTION

A motor vehicle often comprises a plurality of movable objects, the position of which is detected by means of position sensors. To detect the position of a movable object, a position transmitter, such as a passive resonant circuit or a metal element, is often arranged on the movable object. To detect the position of the position transmitter, a differential transformer comprising a primary coil and two secondary coils is often used, wherein the primary coil and the secondary coils can be magnetically coupled via the position sensor.

The primary coil can hereby be excited by means of a carrier signal to induce electric signals in the secondary coils. The induced electric signals can be evaluated in order to determine the position of the position transmitter, for example by means of a processor or a microcontroller. The carrier signal is often regenerated extensively for this purpose.

SUMMARY OF THE INVENTION

An aspect of the invention is to specify a more efficient position sensor.

An aspect of the invention is a position sensor for detecting a position of a position transmitter, wherein the position sensor can be connected to a first electric signal source in order to output a first electric signal with a first frequency and to a second electric signal source in order to output a second electric signal with a second frequency, comprising: a primary coil for generating a alternating magnetic field with the first frequency; a first secondary coil and a second secondary coil, wherein the first secondary coil and the second secondary coil can each be magnetically coupled to the primary coil by means of the position transmitter, and wherein a third electric signal can be induced in the first secondary coil and a fourth electric signal can be induced in the second secondary coil by the generated alternating magnetic field; a frequency converter for converting the third electric signal into a first intermediate frequency signal and for converting the fourth electric signal into a second intermediate frequency signal, wherein the frequency converter is connectable to the second electric signal source; and a Goertzel filter bank for the demodulation of the first intermediate frequency signal in order to obtain a first demodulated signal, and for the demodulation of the second intermediate frequency signal in order to obtain a second demodulated signal. The advantage that an extensive regeneration of the first electric signal can be omitted is attained through this.

The position transmitter can comprise a passive resonant circuit and/or a metal element, such as a metal target, or can be formed by means of a passive resonant circuit and/or a metal element, such as a metal target. The first electric signal source can also comprise or form a carrier frequency generator. The second electric signal source can also comprise or form a local oscillator (LO). For example, the respective electric signal source comprises a frequency generator, an resonant circuit and/or a voltage-controlled oscillator, such as a voltage controlled oscillator (VCO). According to an embodiment, the first electric signal source and the second electric signal source can be connected or can be connectable to a master oscillator, by means of which a reference signal can be generated.

The respective frequency can be predetermined or can be adjusted by means of an actuation element, such as a switch, a rotary knob or a dual in-line package (DIP) switching element, of the respective electric signal source. For example, the respective frequency is 100 kHz, 250 kHz, 500 kHz, 750 kHz, 1 MHz, 2.5 MHz, 5 MHz, 7.5 MHz, 10 MHz, 25 MHz, 50 MHz, 75 MHz, 100 MHz, 250 MHz, 500 MHz, 750 MHz or 1 GHz. According to an embodiment, the second frequency can be smaller than or greater than the first frequency. The primary coil and the respective secondary coils can form a differential transformer or can be comprised in a differential transformer.

The frequency converter can comprise a mixer for converting the third electric signal and/or the fourth electric signal into a lower intermediate frequency range. The Goertzel filter bank can also comprise a filter element, such as a Goertzel filter, for the demodulation of the first intermediate frequency signal and/or the second electric intermediate frequency signal according to the Goertzel algorithm.

In an advantageous embodiment, the position sensor is embodied with a processor for determining the position of the position transmitter as a function of the first demodulated signal or of the second demodulated signal. The advantage that the position of the position transmitter can be detected efficiently is attained through this.

In a further advantageous embodiment, an analog-digital converter is connected upstream of the Goertzel filter bank. The advantage that the Goertzel filter bank can be formed by means of a cost-efficient microprocessor for digital signal processing is attained through this.

In a further advantageous embodiment, a device for signal windowing is connected upstream of the Goertzel filter bank. The advantage that an accuracy of the detection of the position of the position transmitter can be increased is attained through this.

The device for the signal windowing can be embodied for using a window function on the first intermediate frequency signal and/or the second intermediate frequency signal. For example, the window function is a square window function, a Hamming window function, a Hanning window function, a Von-Hann window function, a Blackman window function, a Bartlett window function, a cosine window function, a Tukey window function, a Lanczos window function, a Kaiser window function or a Gauß window function.

In a further advantageous embodiment, the Goertzel filter bank comprises a first Goertzel filter for the demodulation of the first intermediate frequency signal and a second Goertzel filter for the demodulation of the second intermediate frequency signal. The advantage that the respective intermediate frequency signal can be demodulated efficiently is attained through this.

In a further advantageous embodiment, the position sensor is embodied with a signal output for outputting the first demodulated signal or the second demodulated signal. The advantage that the respective demodulated signal can be transferred to an external processor in order to determine the position of the position transmitter is attained through this.

In a further advantageous embodiment, a device for linearizing the first demodulated signal or the second demodulated signal is connected downstream from the Goertzel filter bank. The advantage that the respective demodulated signal can be efficiently processed further is attained through this.

In a further advantageous embodiment, a bandpass filter is connected downstream from the frequency converter. The advantage that the respective intermediate frequency signal can be efficiently filtered out of the output signal of the frequency converter is attained through this.

In a further advantageous embodiment, an amplifier is connected downstream from the frequency converter. The advantage that a level adaptation of the respective intermediate frequency signal can be carried out is attained through this.

In a further advantageous embodiment, the frequency converter comprises a first mixer for mixing the third electric signal with the second electric signal, and a second mixer for mixing the fourth electric signal with the second electric signal. The advantage that the respective intermediate frequency signal can be generated efficiently is attained through this.

In a further advantageous embodiment, the position sensor is embodied with the first electric signal source and the second electric signal source. The advantage that an assembly of the position sensor can be simplified is attained through this.

In a further advantageous embodiment, an amplifier is connected downstream from the first electric signal source or the second electric signal source. The advantage that a level adaptation of the first electric signal or of the second electric signal can be carried out is attained through this.

In a further advantageous embodiment, the position sensor is embodied with a frequency generator for generating a further electric signal with a third frequency, wherein the first electric signal source is embodied to generate the first electric signal on the basis of the further electric signal, and wherein the second electric signal source is embodied to generate the second electric signal on the basis of the further electric signal. The advantage that a master signal for generating the first electric signal and the second electric signal can be provided is attained through this. For example, the frequency generator comprises a master oscillator and the third frequency is 100 kHz, 250 kHz, 500 kHz, 750 kHz, 1 MHz, 2.5 MHz, 5 MHz, 7.5 MHz, 10 MHz, 25 MHz, 50 MHz, 75 MHz, 100 MHz, 250 MHz, 500 MHz, 750 MHz or 1 GHz.

In a further advantageous embodiment, the first frequency or the second frequency is an integral multiple of the third frequency, or the third frequency is an integral multiple of the first frequency or of the second frequency. The advantage that the first electric signal or the second electric signal can be generated efficiently by means of frequency duplication or by means of frequency division is attained through this.

In a further advantageous embodiment, the first electric signal source comprises a synthesizer for generating the first electric signal with the first frequency on the basis of the further electric signal, or the second electric signal source comprises a synthesizer for generating the second electric signal with the second frequency on the basis of the further electric signal. The advantage that the first electric signal or the second electric signal can be generated efficiently is attained through this.

BRIEF DESCRIPTION OF THE DRAWINGS

Exemplary embodiments of the invention are illustrated in the drawings and will be described in more detail below.

DETAILED DESCRIPTION OF THE PREFERRED EMBODIMENTS

Figure 1:
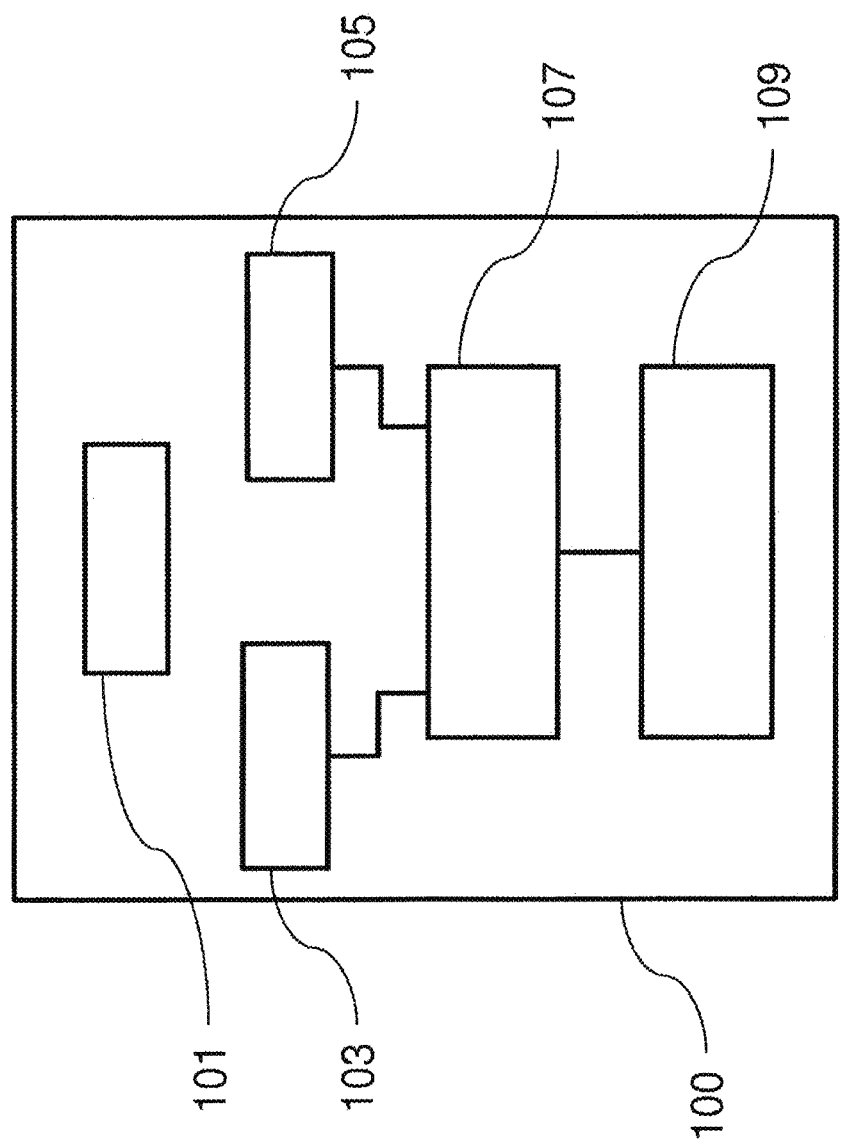
FIG. 1 shows a schematic illustration of a position sensor according to an embodiment.

FIG. 1 shows a schematic illustration of a position sensor 100 according to an embodiment. The position sensor 100 comprises a primary coil 101, a first secondary coil 103, a second secondary coil 105, a frequency converter 107 and a Goertzel filter bank 109.

The position sensor 100 for detecting a position of a position transmitter, wherein the position sensor 100 can be connected to a first electric signal source in order to output a first electric signal with a first frequency and to a second electric signal source in order to output a second electric signal with a second frequency, can be embodied with: the primary coil 101 for generating a alternating magnetic field with the first frequency; the first secondary coil 103 and the second secondary coil 105, wherein the first secondary coil 103 and the second secondary coil 105 can each be magnetically coupled to the primary coil 101 by means of the position transmitter, and wherein a third electric signal can be induced in the first secondary coil 103 and a fourth electric signal can be induced in the second secondary coil 105 by the generated alternating magnetic field; the frequency converter 107 for converting the third electric signal into a first intermediate frequency signal and for converting the fourth electric signal into a second intermediate frequency signal, wherein the frequency converter 107 is connectable to the second electric signal source; and the Goertzel filter bank 109 for the demodulation of the first intermediate frequency signal in order to obtain a first demodulated signal, and for the demodulation of the second intermediate frequency signal in order to obtain a second demodulated signal.

The position transmitter can comprise a passive resonant circuit and/or a metal element, such as a metal target, or can be formed by means of a passive resonant circuit and/or a metal element, such as a metal target. The first electric signal source can also comprise or form a carrier frequency generator. The second electric signal source can also comprise or form a local oscillator (LO). For example, the respective electric signal source comprises a frequency generator, a resonant circuit and/or a voltage-controlled oscillator, such as a voltage controlled oscillator (VCO). According to an embodiment, the first electric signal source and the second electric signal source can be connected or can be connectable to a master oscillator, by means of which a reference signal can be generated.

The respective frequency can be predetermined or can be adjusted by means of an actuation element, such as a switch, a rotary knob or a dual in-line package (DIP) switching element, of the respective electric signal source. For example, the respective frequency is 100 kHz, 250 kHz, 500 kHz, 750 kHz, 1 MHz, 2.5 MHz, 5 MHz, 7,5 MHz, 10 MHz, 25 MHz, 50 MHz, 75 MHz, 100 MHz, 250 MHz, 500 MHz, 750 MHz or 1 GHz. According to an embodiment, the second frequency can be smaller than or greater than the first frequency.

The primary coil 101 and the respective secondary coils 103, 105 can form a differential transformer or can be comprised in a differential transformer.

The frequency converter 107 can comprise a mixer for converting the third electric signal and/or the fourth electric signal into a lower intermediate frequency range. The Goertzel filter bank 109 can also comprise a filter element, such as a Goertzel filter, for the demodulation of the first intermediate frequency signal and/or the second electric intermediate frequency signal according to the Goertzel algorithm.

According to an embodiment, a sensor based on transmitters, the secondary output variable of which represents a voltage, which is amplitude-modulated as a function of the position transmitter or of an angle transmitter, of a primary-side carrier frequency, such as the first frequency, can be used in the inductive position and angle sensor technology, such as in the case of the position sensor 100. A so-called double side band amplitude modulation (AM) with carriers can thus be created on the secondary side. A conclusion can then be drawn as to the absolute distance or the angle by means of precision demodulation of the amplitude-modulated secondary voltages and further processing according to the selected specific measuring methods.

According to a further embodiment, a mode of operation of the position sensor 100 can be based on an evaluation of a difference of secondary voltages, such as, for example, in the case of a permanent magnetic linear contactless displacement (PLCD) method, in which the position of a coupling soft-magnetic core can serve as position transmitter, or in the case of a linear inductive position sensor (LIPS), in which a permanent magnet or a saturation zone in the soft-magnetic core can specify the position. These sensors are operated with relatively low carrier frequencies, such as the first frequency, in the kHz range, often due to the core material.

According to a further embodiment, a mode of operation of the position sensor 100 can be based on a method, in which the windings of the primary coil 101 and/or of the respective secondary coils 103, 105 are embodied according to a specific clear pattern, so that sinusoidal and cosinusoidal envelopes with rigid phase relation of the double side band AM with carrier can result on the secondary side by means of a corresponding position transmitter or position encoder, for example a short-circuit plate with eddy current effect. A position or the location of the position transmitter can be calculated by means of AM demodulation of the supported sine and cosine function via the arc tangent function.

According to a further embodiment, the primary coil 101 or the used transmitter can be embodied so as to be coreless and with few primary windings, for example as a print coil. In most cases, the first frequency or a carrier frequency can be in the lower MHz range, due to the small primary main inductance which is reached, whereby a minimum of transmission efficiency of the primary coil 100 or of the transmitter is preserved. In the case of lower carrier frequencies, the voltage transformation ratio can turn out to be significantly worse and can no longer mainly be determined by the mechanical design, such as the winding ratio primary/secondary and the coupling level, but mainly by the size of the primary coil 101, such as of a primary main inductance, or the impedance thereof. This use of the first frequency or of the carrier frequency in the high-frequency (HF) range, that is, above 1 MHz, will be considered below.

According to a further embodiment, a coherent demodulating synchronous demodulator in the form of an analog multiplier can be used as precision demodulator. The former can provide technical and economic advantages in the considered high-frequency range, because, on the one hand, it can be produced and integrated relatively easily, and because, on the other hand, an analog precision demodulation can be made possible by it in this frequency range. In this context, precision demodulation means a distortion-free separation of the message information from the carrier, even if the modulation level of the AM signal is very large, so that the secondary-side signal mixture can thus turn out to be very small at certain points in time. A synchronous modulation process can take place in this demodulator, in that the double side band AM with carrier is modulated by means of an added carrier wave, the frequency and phase position of which corresponds to the original frequency and phase position in the double side band AM with carrier.

According to a further embodiment, a multiplier can have the following transfer function:

$$u_{De}(t) = u_M(t) \cdot u_{LO}(t)$$

wherein $u_{De}$ identifies a voltage value of an electric signal output by the multiplier, $u_M$ identifies a voltage value of the third electric signal or of the fourth electric signal, $u_{LO}$ identifies a voltage value of the second electric signal, and t identifies the time.

According to a further embodiment, the AM signal, which is to be demodulated, with a carrier, can be given by $$u_M(t) = \hat{u}_T \left( \cos \omega_T t + \frac{m}{2} \cos(\omega_T + \omega_S)t + \frac{m}{2} \cos(\omega_T - \omega_S)t \right)$$

wherein m identifies a level of modulation. Furthermore, the second electric signal or an added carrier wave $u_{LO}(t)$ with a phase shift $\varphi_{LO}$, which is assumed as compared to the original carrier wave, can be given by $$u_{LO} = \hat{u}_{LO} \cos(\omega_T t + \varphi_{LO})$$

According to a further embodiment, $u_{DE}(t)$ and $u_{LO}(t)$ can be supplied to a synchronous demodulator. The output signal thereof can be given by $$u_{De}(t) = \frac{1}{2}\hat{u}_T \cdot \hat{u}_{LO}\left[(1 + m \cdot \cos \omega_S t) \cdot \cos_{\varphi_{LO}} + \cos(2\omega_T t + \varphi_{LO}) + \frac{m}{2}\cos(2\omega_T t + \omega_S t + \varphi_{LO}) + \frac{m}{2}\cos(2\omega_T t - \omega_S t + \varphi_{LO})\right]$$

The calculation shows that, in addition to the modulating signal wave in the spectrum of the demodulation product, the lateral waves for twice the frequency of the carrier wave can also appear. In the further course of the signal processing, they can be suppressed by means of low-pass filters. It can also be seen that the amplitude of the signal wave, which is obtained in this manner, is not only a function of the original modulation signal, but can also be a function of the phase shift $\varphi_{LO}$ of the added carrier as compared to the original carrier. Fluctuations of the phase difference can be perceived as amplitude changes in the case of the respective demodulated signal. In response to a phase shift of odd multiples of 90°, the signal amplitude can become zero. The significance of the phase position in response to the coherent synchronous demodulation can be seen from this. When disregarding the phase condition, demodulation errors can also appear.

Figure 2:
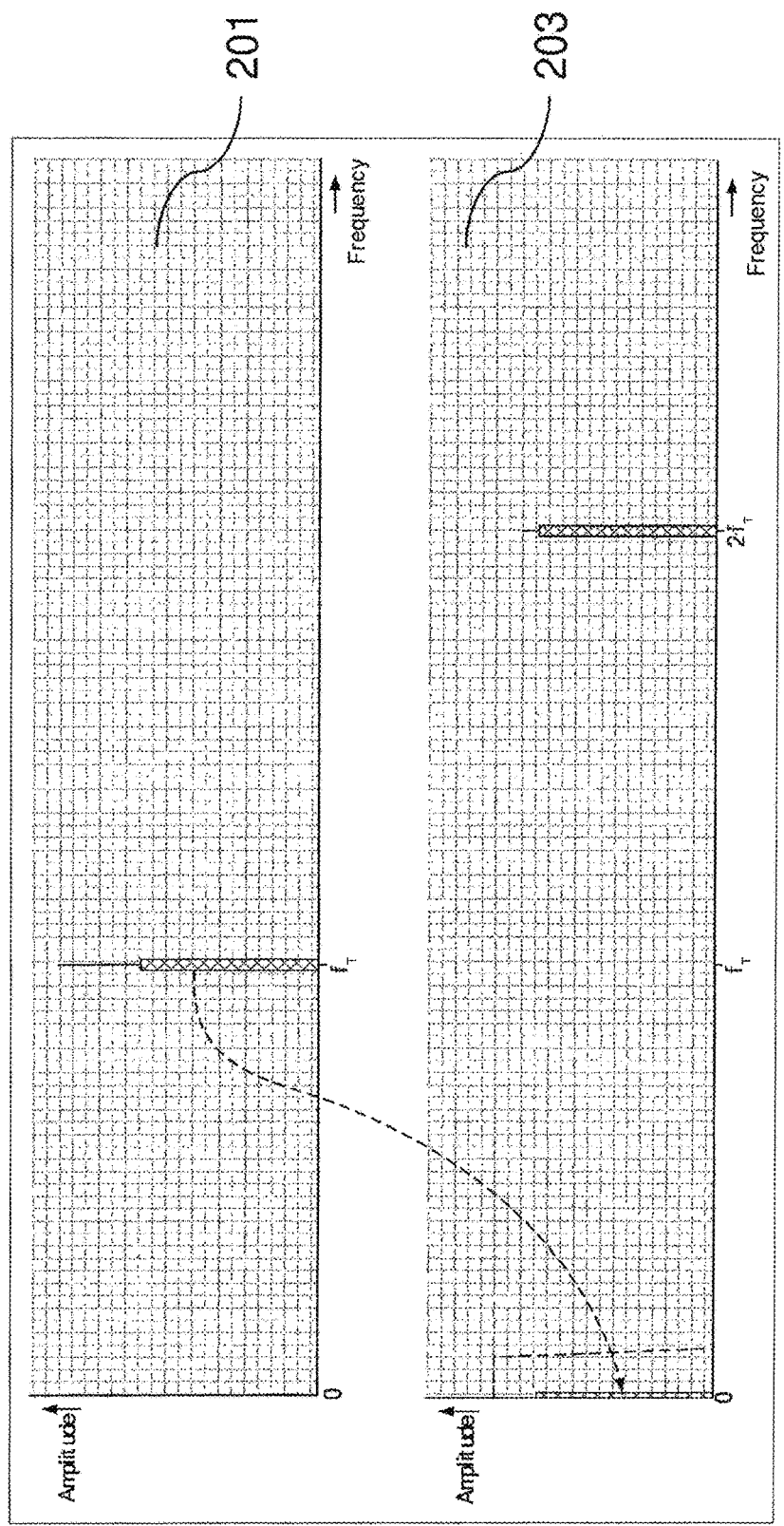
FIG. 2 shows a spectral qualitative illustration of a conversion process of a synchronous demodulation by means of proper phase multiplication of the double side band AM with carrier and an added carrier of the same frequency and phase position.

FIG. 2 shows a spectral qualitative illustration of a conversion process of a synchronous demodulation by means of proper phase multiplication of the double side band AM with carrier and an added carrier of the same frequency and phase position.

The spectral illustration of the conversion process is specified in FIG. 2. The two double side band AMs with carrier signals on the secondary side can be demodulated via synchronous demodulator. An input signal 201 and an output signal 203 of the synchronous demodulator are also illustrated.

In the first alternative, the added carrier is derived from the primary carrier signal. An error-free demodulation with reference to phase errors is at hand in this alternative, when the transmission path of a transmitter, which can be formed by the primary coil 101 and the respective secondary coils 103, 105, does not generate any phase shift whatsoever. Any change of the phase position on the secondary side with regard to the carrier phase position, which can by all means also be a function of distance, angle, temperature or time, can distort the demodulation result.

In the second alternative, the added carrier from the double side band AM with carrier signal on the secondary-side is regenerated, whereby phase errors caused by the transmitter can in principle no longer have an effect. The regeneration of the carrier from the AM signal can be extensive hereby, in particular if the level of modulation becomes very large, for example close to 1, and the signal mixture thus intermittently becomes so small that a regeneration can be made more difficult, whereby the synchronous demodulator, which is actually advantageous, can thus in actuality adopt the behavior and the precision of a simple incoherent envelope curve demodulator.

According to a further embodiment, an AM demodulation method, which can operate completely independently from an auxiliary carrier and thus phase-independently, but which can nonetheless provide the precision, which the synchronous demodulator can have as well, provided that the mentioned auxiliary conditions are set correctly, can be used in the position sensor 100. Methods, which offer this option, are the so-called incoherent AM demodulation methods.

Figure 3:
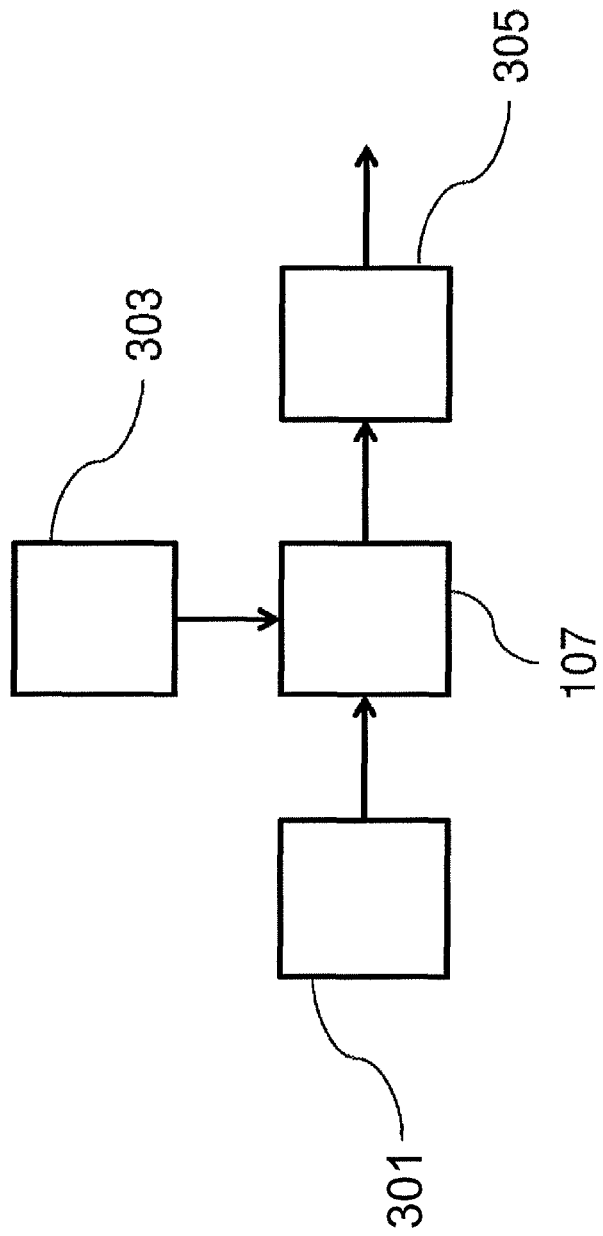
FIG. 3 shows an operating principle of the frequency converter.

FIG. 3 shows an operating principle of the frequency converter 107. A carrier oscillator 301, a local oscillator 303 and a selective intermediate frequency amplifier 305 are also illustrated. The carrier oscillator 301 can be embodied for outputting an electric signal with a frequency $f_T$. The local oscillator 303 can also be embodied for outputting an electric signal with a frequency $f_{LO}$. The frequency converter 107 can also comprise a mixer and can be embodied for outputting an electric signal with mixed frequencies $f_{Misch}$. The selective intermediate frequency amplifier 305 can also comprise a bandpass filter and can be embodied for outputting an electric signal with a frequency $f_{ZF}$.

According to an embodiment, a frequency conversion can be used with the help of the frequency converter 107 or a mixer in a lower intermediate frequency range ZF and the subsequent AM demodulation with an incoherent demodulation method. In contrast to the related frequency division, which operates with square wave signals and by means of which a processing is also made possible at lower frequencies, the originally modulated information can be maintained completely in response to the frequency mixing.

FIG. 3 shows the operating principle by means of a block diagram: the cosinusoidal carrier frequency $f_T$ and the cosinusoidal auxiliary frequency of the local oscillator 303 $f_{LO}$ are mixed in the frequency converter 107. The frequency converter 107 can behave like an ideal multiplier, in the case of which the mixing frequencies $f_{Misch}$ appear on the output side as sum and differential frequency of the input frequencies.

According to an embodiment, the frequency converter 107 can be designed as a switching mixer, in which the local oscillator signal represents a time-symmetrical square wave signal in order to optimize the mixer efficiency.

In consideration of the Fourier series of the time-symmetrical square wave, multiplied by the cosinusoidal carrier signal, whereby an unmodulated cosine signal is assumed here, the output signal of the frequency converter 107 can be expressed temporally as follows:

$$u_{Misch}(t) = \underbrace{u_{LO}(t)}_{\text{time-symmetrical square wave}} \cdot \underbrace{u_T(t)}_{(LO)\text{Information}}$$

$$u_{Misch}(t) = \frac{4}{\pi} \cdot (\cos \omega_{LO} t - \frac{1}{3}\cos 3\omega_{LO} t + \frac{1}{5}\cos 5\omega_{LO} t \mp \ldots) \cdot \hat{u}_T \cos \omega_T \cdot t$$

(here: carrier signal)

By using addition theorems, it follows:

$$u_{Misch}(t) = \frac{4}{\pi} \cdot \frac{1}{2}\hat{u}_T \Big(\cos(\omega_{LO} + \omega_T)t + \cos(\omega_{LO} - \omega_T)t - \frac{1}{3}\cos(3\omega_{LO} + \omega_T)t - \frac{1}{3}\cos(3\omega_{LO} - \omega_T)t + \frac{1}{5}\cos(5\omega_{LO} + \omega_T)t + \frac{1}{5}\cos(5\omega_{LO} - \omega_T)t \mp \ldots \Big)$$

Once converted into the intermediate frequency (ZF) range, all options of the simple and cost-efficient amplification, filtering and demodulation can be available. The mixed products of a higher order and possible carrier and LO remainders can be suppressed by means of a ZF band filter, such as the bandpass filter of the selective intermediate amplifier 305.

The symmetrical push-pull switching mixer, which comes very close to the above-mentioned ideal mixer for the desired frequency range of the position sensor 100, is to be used hereinafter in an exemplary manner from the plurality of the mixer principles, which are available in practice, with individual advantages and disadvantages.

In the case of symmetrical signal feed of $f_T$ and $F_{LO}$, a frequency converter 107 or mixer can be obtained, which, at very low costs, is characterized by high carrier suppression, low mixing losses and the ability to not generate any further, new frequencies, which may possibly appear in the ZF range, in addition to the expected mixed products, even in the case of large input signals, and which frequency converter or mixer thus has a high large signal stability.

Figure 4:
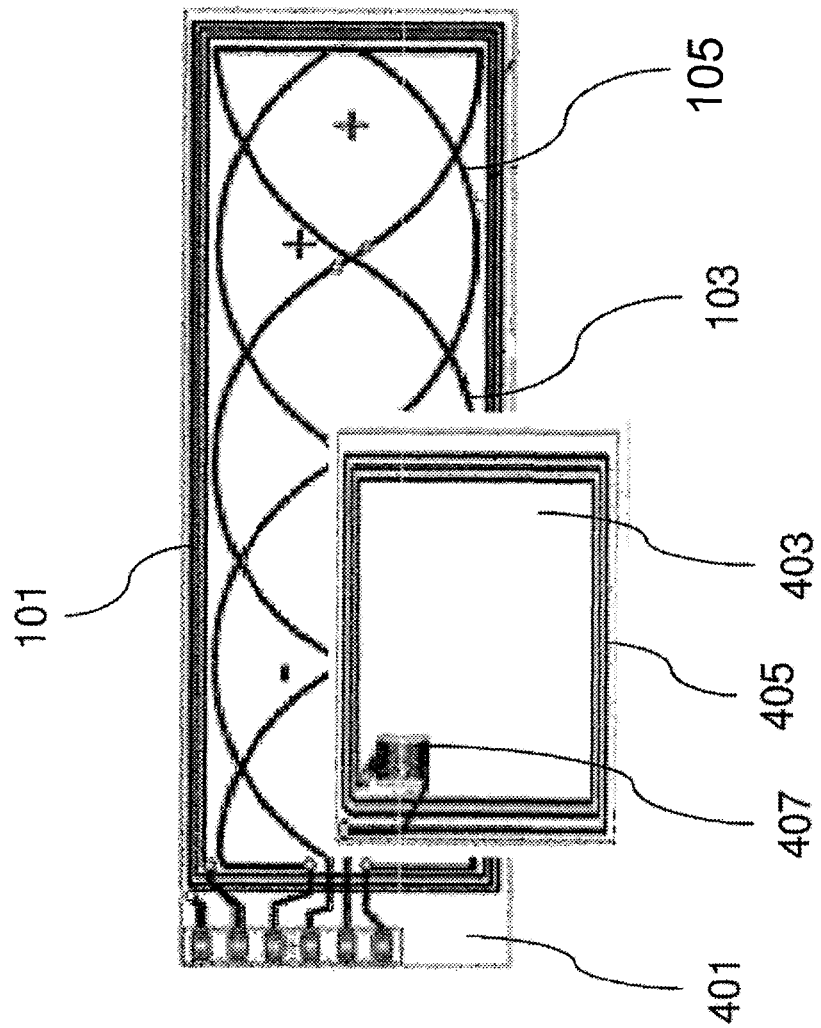
FIG. 4 shows an arrangement comprising a circuit board and a position transmitter.

FIG. 4 shows an arrangement comprising a circuit board 401 and a position transmitter 403. The primary coil 101, the first secondary coil 103 and the second secondary coil 105 are arranged on the circuit board 401. The position transmitter 403, like a target, also comprises a resonant parallel resonant circuit comprising a coil 405 and a capacitor 407.

The arrangement is an ironless planar transformer. The primary coil 101, for example an excitation winding, and the respective secondary coils 103, 105, for example sensor windings, are attached to the stationary circuit board 401.

The respective secondary coils 103, 105, such as sensor coils, are each arranged individually in such a way that the induced voltages of the primary coil 101 or of a primary winding cancel each other out when a position transmitter 403 is missing. This can preferably be realized by means of windings, the phasing of which reverses. The surface areas of the respective enclosed windings can always be the same. A high-frequency AC voltage, for example in the lower MHz range, is now applied to the excitation winding. The respective secondary coils 103, 105 can be arranged geometrically in such a way that the output signals thereof represent a sine and a cosine wave pattern.

According to an embodiment, a metal element, such as a metal target, which is adapted to the sensor geometry, can be guided across the circuit board 401 in order to determine the position, in order to attenuate certain areas of the sensor windings of the respective secondary coils 103, 105. This attenuation is created by induced eddy currents in the metal element. The respective output signal can follow from the portion of the unattenuated respective secondary coils 103, 105.

According to a further embodiment, the position transmitter 403 comprises a passive resonant circuit. The latter can comprise the coil 405, such as a planar coil, and the capacitor 407, such as a capacitance. A resonance frequency of the passive resonant circuit can also be adapted to the first frequency, such as an excitation frequency of the primary coil 101. This technology can have various advantages. One advantage can be provided in that the output signals of the respective secondary coils 103, 105, such as the secondary windings, do not result from the unattenuated portion. An improved signal transmission can be attained by means of the design of the position transmitter 403, such as a target, in resonance with the first frequency. The quality factor can hereby be 10-times higher than in the case of a metal element or metal target. A further advantage of this arrangement can be provided by means of a low distance sensitivity. As already described, the resonance frequency of the position transmitter 403, such as an LC target, is designed for the first frequency. In a relatively narrow-band frequency range, the respective secondary coils 103, 105, such as sensor coils, react to the position and the change of the position transmitter 403, such as a target. If the first frequency is changed and is outside of the resonance frequency of the resonant circuit, the position sensor 100 can lose its effect.

According to a further embodiment, the first frequency can be in the range of between 1.5 MHz and 6 MHz. 1.5 MHz can hereby mark approximately a lower functional limit of the inductive measuring principle comprising the transformer design at hand, while the symmetrical push-pull switching mixer used herein in an exemplary manner, can be used up to approximately 6 MHz.

According to a further embodiment, an intermediate frequency (ZF) frequency, which results in the conversion process in the frequency converter 107, can be $f_{ZF}$<200 kHz. The ZF frequency can preferably be $f_{ZF}$<100 kHz, because small ZF frequencies can contribute significantly to a simple and thus cost-efficient analog signal preprocessing.

According to a further embodiment, the majority of the signal processing, such as an incoherent AM demodulation, can take place in digital form. A microcontroller, such as a μC, can be used for this purpose and can be utilized optimally, that is, in addition to the digital signal processing, said microcontroller can also be used for further tasks, for example the generation of first frequency and second frequency, such as carrier and local oscillator frequency. Even though an analog demodulator can also be used on principle, a cost reduction can be attained by using the microcontroller.

Figure 5:
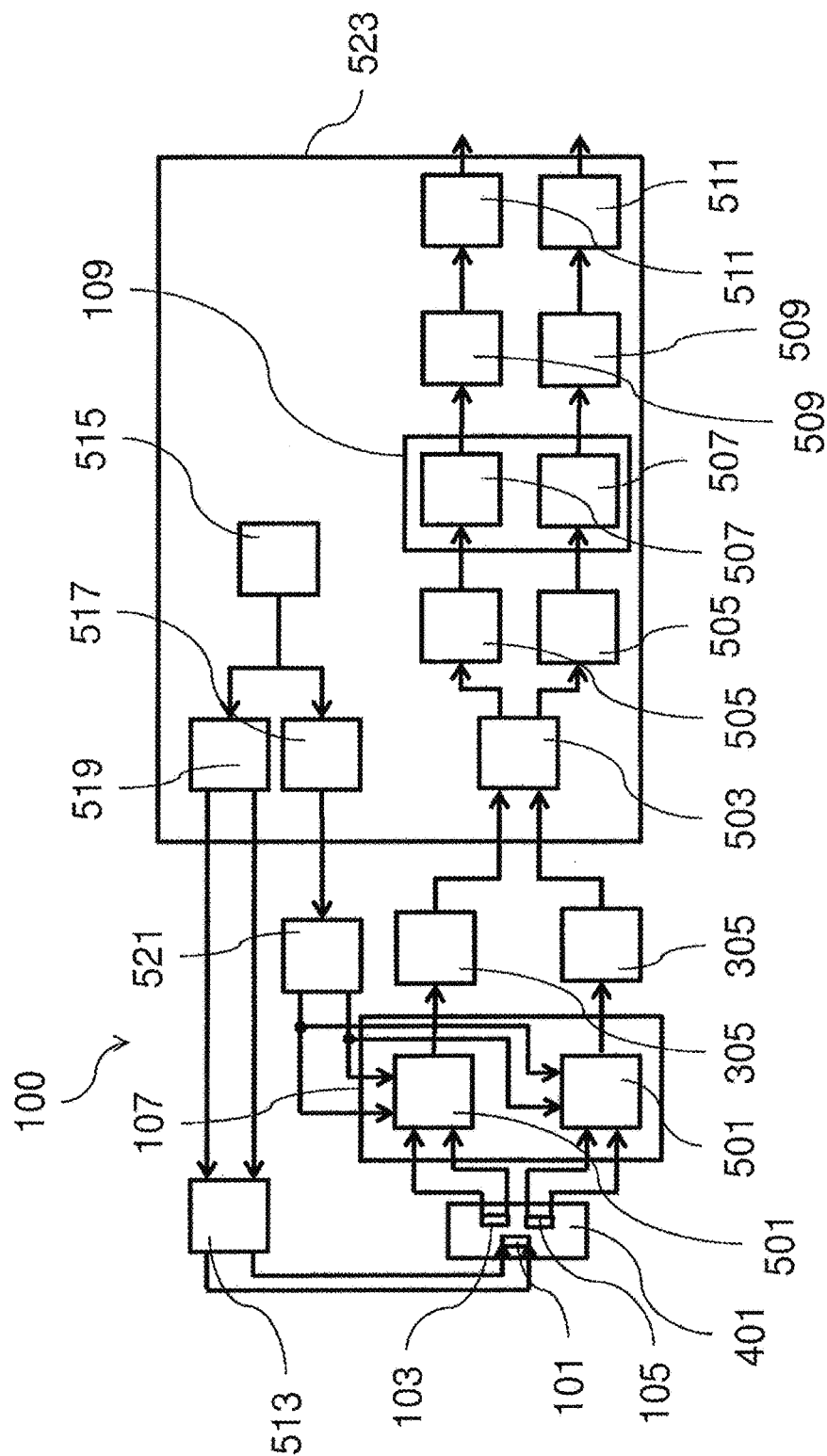
FIG. 5 shows a schematic illustration of the position sensor according to a further embodiment.

FIG. 5 shows a schematic illustration of the position sensor 100 according to a further embodiment. The position sensor 100 comprises the primary coil 101, the respective secondary coils 103, 105, the frequency converter 107 comprising two mixers 501, two selective intermediate frequency amplifiers 305, which in each case comprise a bandpass filter, an analog-digital converter 503, two devices 505 for signal windowing, the Goertzel filter bank 109 comprising two Goertzel filters 507, two devices 509 for linearization, two signal outputs 511, an amplifier 513, a master oscillator 515, two timers 517, 519, and a synthesizer 521. The analog-digital converter 503, the devices 505 for signal windowing, the Goertzel filter bank 109, the devices 509 for linearization, the signal outputs 511, the master oscillator 515, and the timers 517, 519 are arranged in a microcontroller 523, such as an μC with digital signal processing. The primary coil 101 and the respective secondary coils 103, 105 are also arranged on the circuit board 401.

The amplifier 513 can form a primary controller. The timer 519 can also form the first electric signal source. The timer 517 and the synthesizer 521 can also form the second electric signal source. The master oscillator 515 can also form the frequency generator for generating the further electric signal with the third frequency. The devices 509 for linearization can also be embodied for carrying out a characteristic curve correction. The signal outputs 511 can also be digital or analog output interfaces. The signal processing path, which starts at the first secondary coil 103, can also be a sine path; the signal processing path, which starts at the second secondary coil. 105, can also be a cosine path. The circuit board 401, the primary coil 101 and the respective secondary coils 103, 105 can also form a sine/cosine transmitter.

The timer 519 can be embodied for outputting the first electric signal with the first frequency $f_T$. The synthesizer can also be embodied for outputting the second electric signal with the second frequency $f_{LO}$. The selective intermediate frequency amplifiers 305 can in each case also be embodied for outputting an electric signal with the frequency $f_{ZF}$. The timer 517 can also be embodied for outputting an electric signal with the frequency $f_h$.

According to an embodiment, the position sensor 100 shown in FIG. 5 can represent a realization option with a frequency conversion into the so-called base band of the further digital signal processing. In this context, base band means that the ZF frequency, which is generated by means of the conversion process, in addition to lateral frequencies, appears within a frequency range, which can range from 0 to half of the sampling frequency of the used analog-digital converter 503. The sampling process can thus take place in an error-free manner according to the general sampling theorem. Following the signal flow, the already discussed transmitter, the respective secondary coils 103, 105 of which are embodied in such a way that a sinusoidal or cosinusoidal envelope, respectively, of the carrier wave results temporally by moving the non-illustrated position transmitter 403, is initially arranged in the left-hand area in FIG. 5. On the primary side, a control can take place by means of a carrier frequency generator. The further analog processing of the signals with sinusoidal or cosinusoidal envelopes, respectively, takes place separately for each signal in the corresponding sine path or in the cosine path, respectively, which can have identical characteristics. The supported sine signal is initially converted into an intermediate frequency range with the help of the second electric signal with the second frequency in the subsequent mixer 501. The subsequent selective intermediate frequency amplifier 305 frees the signal from undesired higher mixed products on the one hand and can likewise serve as anti-aliasing filter for the subsequent sampling process in the analog-digital converter 503. A level adaptation also takes place, so that the subsequent analog-digital converter 503 can be controlled sufficiently.

Figure 6:
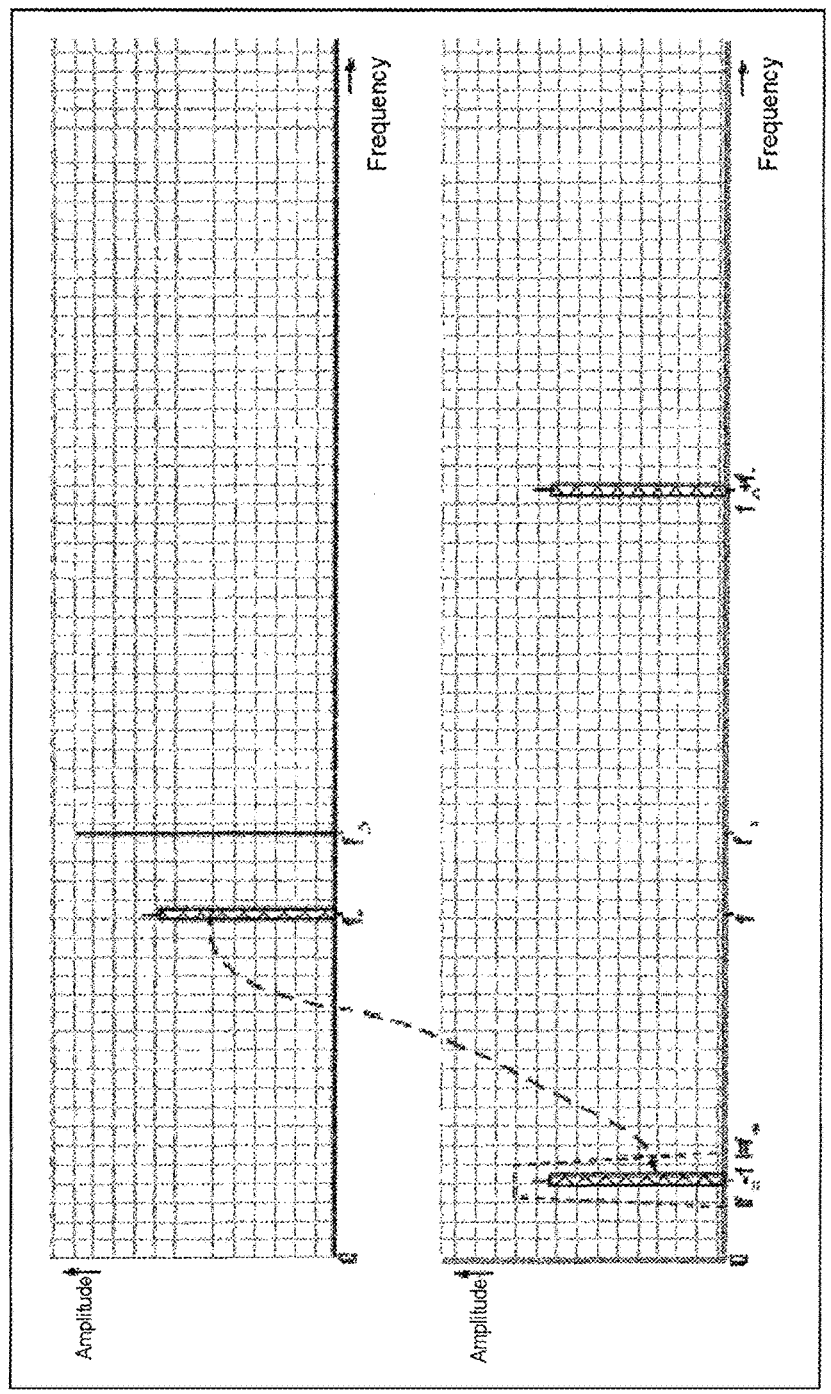
FIG. 6 shows a spectral, qualitative illustration of a frequency conversion from a high-frequency range into an intermediate frequency range.

FIG. 6 shows a spectral qualitative illustration of a frequency conversion from a high-frequency range into an intermediate frequency range. For example, the intermediate frequency range defines a base band.

According to an embodiment, the signal processing can take place in a digital manner by means of the analog to digital conversion. Said signal processing can also take place in two phases, for example by time division in the microcontroller 523 or a µC.

According to a further embodiment, the Goertzel algorithm, such as a 1-point discrete Fourier transformation (DFT), can be used as digital AM demodulation method. By means of the calculation of the 1-point DFT, a precision demodulation of the amplitude-modulated ZF signal can be carried out in a fairly simple manner. In addition, the use thereof results in further advantages:

A selective demodulation process can take place, the digital filter of which, comprising parameters, which are fixedly selected once and which are set so as to be immovable, can represent an addition to the analog ZF filter.

Based on the principle of oversampling and decimation, a significant improvement of the entire signal quality can be associated with the Goertzel algorithm, as a function of the parameterization. A higher effective digital resolution can involve a gain of signal-to-noise ratio of the measuring variable.

A flexible selection of the Goertzel parameters: important parameters of the DFT, such as, e.g., the block size N, can directly influence the level of the oversampling and thus the signal quality as well as the bandwidth of the Goertzel filter. Diametrically opposed thereto are important sensor parameters, such as, for example, maximally processable modulation frequency of the AM-ZF signal or the processing time, such as a group delay. This is the time, which is required to display a change of the physical variable as measuring result, the error-free detection of which is also a function of the block size N, for example. Due to the flexible definition of the Goertzel parameters, finding a compromise can be facilitated hereby.

According to a further embodiment, it can be advantageous to connect the device 505 for signal windowing, such as a signal block "windowing", upstream of the Goertzel filter bank 109 or of a Goertzel filter 507. While even generated frequencies, such as, e.g., the converted carrier in the ZF plane, can be chosen in such a way that the frequency thereof is always an integral multiple or divider of the sampling frequency and can thus be processed in an error-free manner without particular window function, this often does not apply for the lateral frequencies of the AM signal in ZF position.

According to a further embodiment, the lateral frequencies can be determined by the physical variable, which is to be sensed, and can thus be in any ratio to the sampling frequency. This can lead to linear distortions, in particular when using the square wave window, synonymous with no particular window function, in the case of higher modulation frequencies, such as lateral frequencies, from the carrier of the AM: As a function of the AM modulation frequency, a weighting can be made by means of the Goertzel filter 507, so that low frequencies in the proximity of the carrier are demodulated with a high amplitude, but higher frequencies, which are located further away from the carrier, are demodulated with an amplitude, which is sometimes significantly lower.

According to a further embodiment, the type of the window function can significantly codetermine the transmittance of the Goertzel filter 507 with regard to selectivity, such as an edge steepness, but also the usable width of the pass-band area. In other words, it can be stated in summary that, in addition to the correctly chosen block length N, the window function determines the amplitude output of the digital AM demodulator in the form of the Goertzel filter 505.

According to a further embodiment, the further digital signal processing can be completed by the devices 509 for linearization or a stage for the linearization of the demodulated sine or cosine function, which can be carried out particularly easily in digital form. Simple methods, such as, e.g., the piece by piece linear approximation, can represent manageable additional computing time.

According to a further embodiment, the demodulated sine and cosine signals can be output analogously or digitally for further processing on the signal outputs 511, such as on output interfaces.

According to a further embodiment, the frequencies which are used or which can be found, can be selected on the basis of the following points, based on the use of the Goertzel algorithm as demodulation method:

All of the frequencies involved in the signal processing process, such as the respective frequencies of the respective electric signals, the carrier frequency, the local oscillator frequency, the sampling frequency, and/or switching frequencies of the digital signal processing, can be derived from a common time base, such as the master oscillator 515. In combination with the Goertzel algorithm, the advantage which can be obtained from this is that even though frequency deviations of the master oscillator 515 have an effect on the absolute value of the ZF frequency, it ultimately has no impact, based on the result of the demodulation. Due to the rigid coupling of the generated frequencies among one another, the center frequency of the Goertzel filter 507 can be adjusted proportionally in such a way that it coincides with the ZF frequency. In this constellation, the Goertzel filter 507 can thus represent a filter, which runs along to some extent and which is adjusted to the ZF frequency.

In the case of a signal processing in the base band, the ZF frequency generated by means of the mixing, can be within the frequency range $0<f_{ZF}<F_S/2$, in order to fulfill the sampling theorem. When being arranged close to 0 or close to half of the sampling frequency, it can be considered that the ZF signal is a modulated signal with lateral frequencies, which can also fulfill the above conditions.

The sampling frequency can be an integral multiple of the ZF frequency. A dimensioning of the Goertzel filter 507 can thus be facilitated. It can also be attained that the carrier, which is converted into the ZF position, always coincides with the center frequency of the pass-band of the Goertzel filter 507. Non-linear distortions of the demodulated signal, caused by an asymmetrical position of the lateral frequencies in the ZF signal with regard to the pass-band of the Goertzel filter 507, can be avoided or at least reduced hereby.

For example the following values are adjusted. They then serve as base for further frequencies, which are derived therefrom and which are adapted:

Main switching frequency of the master oscillator 515: $f_{mc}$=24 MHz.

Sampling frequency for both paths: $f_S$=160 kHz.

According to a further embodiment, the position sensor 100 can be produced in a more cost-efficient manner by integrating these assemblies in the microcontroller 523, in particular when the timers 517, 519 of the microcontroller 523 illustrated in FIG. 5 can be used directly for generating the carrier frequency $f_T$ and the frequency of the synthesizer 521, such as a local oscillator, $f_{LO}$. Due to the fact that the microcontroller 523-internal timers 517, 519 generate only frequencies, which were divided with integral divider factors from the main switching frequency, a rough calculation already shows that the above conditions with regard to the position of the ZF frequency and minimum carrier frequency cannot be fulfilled without additional effort. A practical small ZF frequency, which is to be strived for the above-mentioned reasons, can be attained:

when the divider factors div1 and div2 for generating $f_T$ and $f_{LO}$ according to the relationships $$f_T = \frac{f_{mc}}{div1}$$

and $$f_{LO} = \frac{f_{mc}}{div2}$$

are as large as possible; and when div1 and div2 result in the amount difference of one:

$$|div1-div2|=1. \; div1 \in \mathbb{N} \; ; \; div2 \in \mathbb{N}.$$

It can be seen that even with a chosen factor div1=16 $\triangleq$ $f_T$=1.5 MHz and div2=17 $\triangleq$ $f_{LO}$≈1.412 MHz, according to a low carrier frequency and the amount difference of one between div1 and div2, the requirement with regard to the ZF frequency $0<f_{ZF}<f_S/2$ is possibly already missed, because it follows: $f_{ZF}=f_T-f_{LO}$=1.5 MHz−1.412 MHz≈88.24 kHz.

According to a further embodiment, a "p-q frequency synthesis" can be used for reaching a sufficiently small ZF frequency. The matching LO frequency is hereby obtained by duplication by the integral factor q of an auxiliary frequency, which has the same frequency as the ZF frequency $f_h$, which is strived for. The auxiliary frequency can first be obtained by means of frequency division by the factor p from the carrier frequency, wherein the following applies: |p−q|=1. To find a frequency constellation, which corresponds to the above conditions, one can proceed as follows:

selecting a ZF frequency, which corresponds to the requirements;

selecting a first frequency or carrier frequency $f_T$, which satisfies the requirements and which represents an integral multiple of the selected ZF frequency; and calculating the integral factors $$p = \frac{f_T}{f_{ZF}}$$

and q=p±1. p∈$\mathbb{N}$ ; q∈$\mathbb{N}$ ;

While the above flow chart can be used without limitations, some frequency combinations, which can also fulfill all of the conditions with a significantly smaller duplication factor q, can be found among the plurality of possible frequency combinations. A smaller factor q can reduce the switching effort and can thus save costs.

For example the frequencies $f_T$=4 MHz and $f_{ZF}$=32 kHz represent such a combination. The auxiliary frequency is not 32 kHz here, but the duplication can also start at 192 kHz, in order to get to an LO frequency of $f_{LO}$=4.032 MHz. All of the requirements on the involved frequencies can thus be fulfilled.

Figure 7:
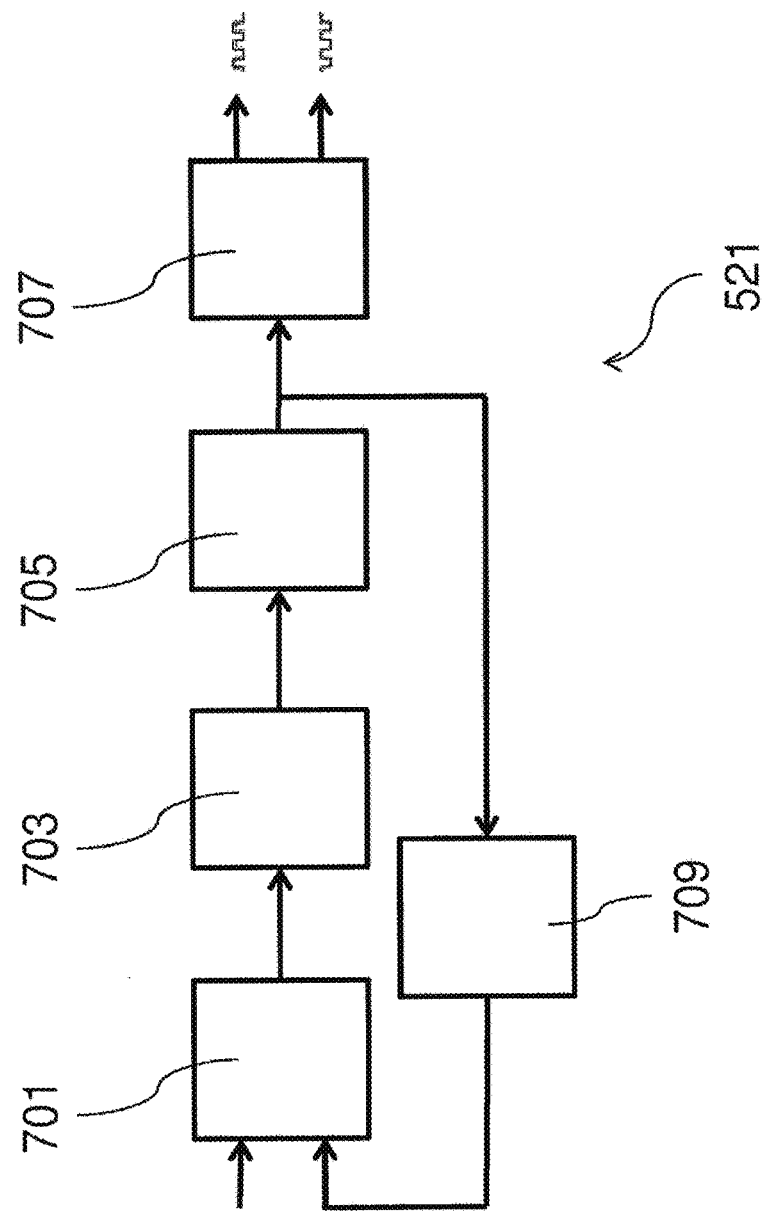
FIG. 7 shows a schematic illustration of the synthesizer according to an embodiment.

FIG. 7 shows a schematic illustration of the synthesizer 521 according to an embodiment. The synthesizer 521 can be embodied as a frequency duplicator and for outputting a signal and time-symmetrical square wave signal. The synthesizer also comprises a phase detector 701, a loop filter 703, such as a low pass filter, a voltage-controlled oscillator 705, such as a voltage controlled oscillator (VCO), a flip-flop 707, such as a D-flip-flop, and a frequency divider 709.

The phase detector 701 can receive an electric signal with the frequency $f_H$. The voltage-controlled oscillator 705 can also output an electric signal with the frequency $42f_H$. The flip-flop 707 can also output two electric signals with the frequency $21f_H$. The frequency divider 709 can also be embodied to divide a frequency of an incoming electric signal by the factor 42.

While the carrier frequency $f_T$=4 MHz and the auxiliary frequency $f_h$=192 kHz, as illustrated in FIG. 5, can be generated directly via the timers 517, 519 of the microcontroller 523, the duplication of 192 kHz to 4.032 MHz=$f_{LO}$, can take place, e.g. by means of the synthesizer 521 illustrated in FIG. 7, such as a PLL frequency synthesizer. The output frequency of the voltage-controlled oscillator 705 can hereby be an integral multiple of the standard frequency $f_h$, wherein the duplication factor is determined by the division factor of the frequency divider, which is located in the feedback loop. For purely practical reasons, the factor q is not q−21, as required, but q=42. This is due to the fact that a signal- and time-symmetrical square wave signal is preferably used for controlling the mixer 501. The flip-flop 707 located at the output of the synthesizer 523 can provide said square wave signal in an adjustment-free manner. Due to the fact that a frequency division with factor two can be associated with the use of the flip-flop 707, the LO signal at the output of the flip-flop 707 can be available with the correct frequency and signal form.

Figure 8:
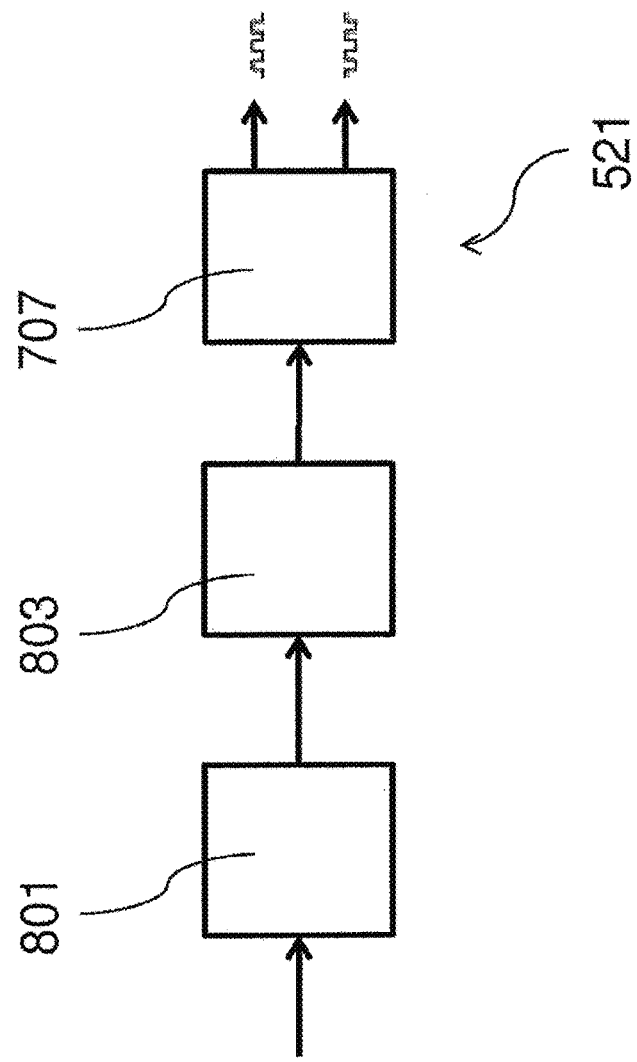
FIG. 8 shows a schematic illustration of the synthesizer according to a further embodiment.

FIG. 8 shows a schematic illustration of the synthesizer 521 according to a further embodiment. The synthesizer 521 can be embodied as a harmonic frequency duplicator and for outputting a signal- and time-symmetrical square wave signal. The synthesizer also comprises two selective limiter-amplifiers 801, 803, which can in each case comprise a bandpass filter, and the flip-flop 707.

The selective limiter-amplifier 801 can receive an electric signal with the frequency $f_h$, can have a center frequency $f_{mitte}=7f_h$, and can output an electric signal with the frequency $7f_h$. The selective limiter-amplifier 803 can also have a center frequency $f_{mitte}=6*7f_h$ and can output an electric signal with the frequency $42f_h$.

According to an embodiment, an efficient method for the integral frequency duplication can be carried out by means of a harmonic frequency duplicator, specifically when only a fixed frequency is generated. The fact that in the case of a pulse duty factor of ≠50%, viewed spectrally, even and odd multiples of the basic frequency $f_h$ can often also be included in the pulse-shaped auxiliary frequency $f_h$, can be put to use here. This can also include the LO frequency $f_{LO}$, among others. By means of selectively adjusted amplifier stages, such as the selective limiter-amplifiers 801, 803, this harmonic can be separated and can be processed further. To keep the requirements on the selectivity of the selective limiter-amplifiers 801, 803 small, duplication can take place in stages. A use based on the example illustrated herein is shown in FIG. 8. The duplication factors are divided into: $f_h \cdot 6 \cdot 7 = f_h \cdot 42 = 2 \cdot f_{LO}$. Here, the flip-flop 707 can also ensure perfectly symmetrical square wave signals with the correct local oscillator frequency $f_{LO}$, by using a frequency divider factor of two.

Figure 9:
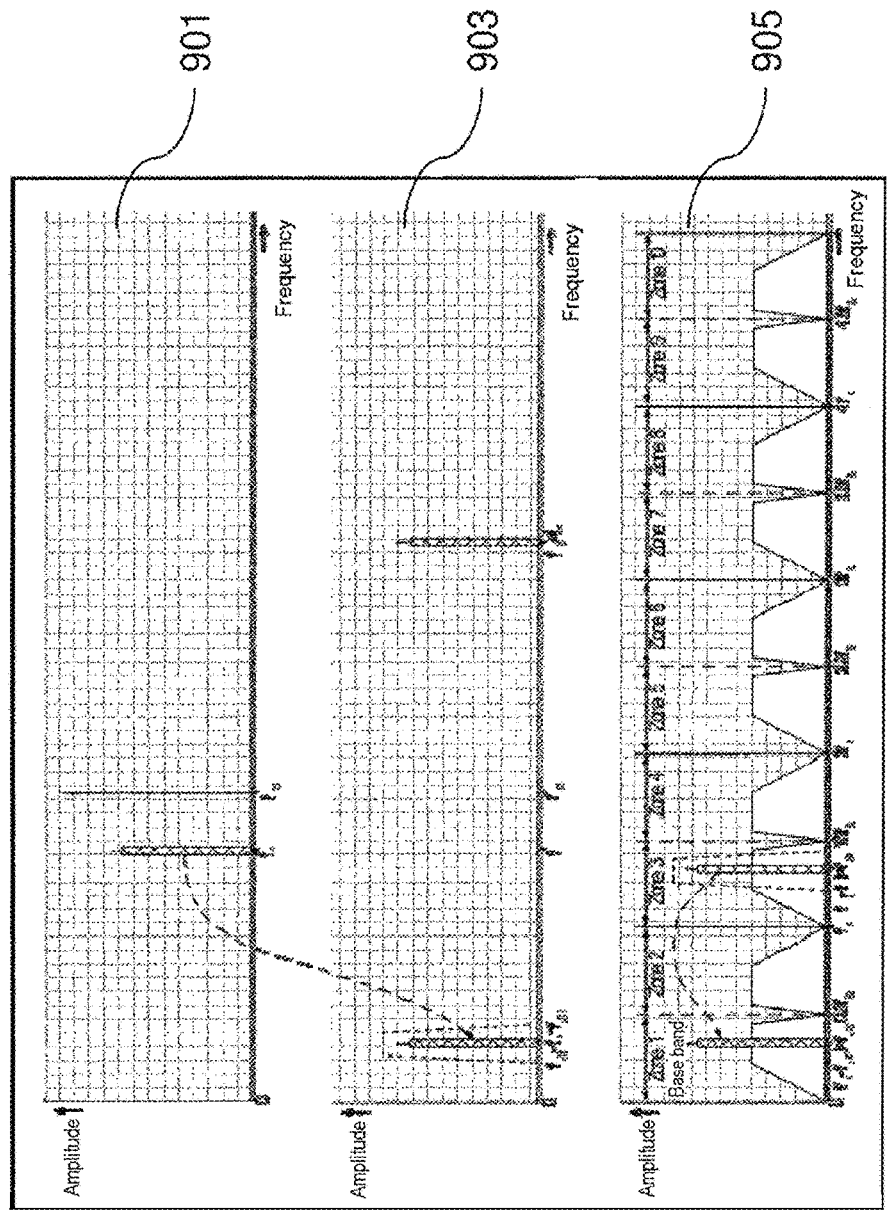
FIG. 9 shows a spectral qualitative illustration of a two-stage frequency conversion from a high-frequency range into an intermediate frequency range.

FIG. 9 shows a spectral qualitative illustration of a two-stage frequency conversion from a high-frequency range into an intermediate frequency range. The illustration comprises a first schematic spectrum 901, a second schematic spectrum 903 and a third schematic spectrum 905.

The frequency conversion from the high-frequency range into a first intermediate frequency range as is shown in the transition from the first schematic spectrum 901 to the second schematic spectrum 903, and subsequently a conversion from the first intermediate frequency range into a second intermediate frequency range, as into a digital base band hereby takes place by means of sub-sampling. This is shown in the transition from the second schematic spectrum 903 to the third schematic spectrum 905. In the illustration shown in FIG. 9, the third schematic spectrum 905 has a different frequency scale as compared to the first schematic spectrum 901 and the second schematic spectrum 903.

According to an embodiment, an effectivity of the position sensor 100 can be increased further by using a sub-sampling method, in which the downmixed ZF frequency does not appear directly in the digital base band. The synthesizer 521, like a separate frequency synthesizer, can be omitted hereby, as will be shown below. The basis of the sub-sampling method is the sensitivity of the analog-digital converter 503, which is generally caused by the sampling, not only in the base band, which spans a frequency zone of between 0 and $f_s/2$, but also in seamlessly aligned discretely returning higher frequency zones of the frequency width $f_s/2$. In the case of the previously used direct base band processing, signal frequencies in these higher zones represented the so-called alias frequencies, which can result in the corruption of information, provided that they are not suppressed sufficiently. If sub-sampling occurs, the signals are intentionally placed into a higher frequency zone, from where high-frequency signals can be made accessible to the digital signal processing in spite of the low-frequency sampling frequency. The process of the sub-sampling can also be interpreted as frequency conversion. In this case, the sampler represents the frequency converter 107, such as a mixing stage. By means of the pulse-shaped local oscillator frequency, represented by the sampling frequency $f_s$, a conversion can take place according to: $f_{ZF2}=|f_s-f_{ZF1}|$, wherein $f_{ZF1}$ represents the sub-sampled signal and $f_{ZF2}$ represents the signal, which is converted into the digital base band by means of the sub-sampling. This equation can be valid, provided that $f_{ZF1}$ is within the frequency zones two or three in the third schematic spectrum 905. In higher frequency zones, the n-th sampling frequency, which belongs to the respective zones, can be considered. Due to the fact that a conversion into the digital base band takes place by means of the integral factor n in the case of harmonic multiples of the sampling frequency, the sub-sampling is also referred to as a harmonic sampling. The contexts of the involved frequencies and conversion process, which were just mentioned, are illustrated in FIG. 9: while the transition from the first schematic spectrum 901 to the second schematic spectrum 903 represents the conversion process by mixing with the local oscillator frequency, wherein the first (analog) intermediate frequency $f_{ZF1}$ is created, the sub-sampling process is illustrated in the third schematic spectrum 905 in response to changed frequency scaling, in that $f_{ZF1}$, located in zone 3 and thus being above the sampling frequency, is transferred into the digital base band by means of sub-sampling. The equation $f_{ZF2}=|f_s-f_{ZF1}|$ applies. The generated second intermediate frequency $f_{ZF2}$ is the frequency, which is relevant for the further digital signal processing, on which the parameters, which are to be adjusted, can orientate themselves. Due to the fact that the second ZF is initially not in any context with the first ZF, which is provided in an analog manner, but is only determined by the relation of the sampling frequency $f_s$ and the position of $f_{ZF1}$, $f_{ZF2}$ can also be identified as interpreted frequency of $f_{ZF1}$. So that the sub-sampling method or the sampling in general can be used without interferences and without information corruption, some conditions can be fulfilled:

The general sampling theorem according to Nyquist can be adhered to, which, transferred to this application, states: $f_s > 2 \cdot Bf_{ZF1}$, wherein $Bf_{ZF1}$ represents the bandwidth of $f_{ZF1}$.

No statement, even though a decisive aspect, matches the sampling theorem with regard to the position of the first ZF frequency in the spectrum. What applies here is that the ZF signal can be arranged in the center, if possible, as well as centered, within a frequency zone of the third schematic spectrum 905. An overlapping of $f_{ZF1}$ with lateral frequencies beyond the zone boundaries is not permitted and would lead to the information corruption in spite of maintained bandwidth condition $f_s > 2 \cdot Bf_{ZF1}$.

The white asymmetrical trapezes within the sub-sampling zones, which are also illustrated in FIG. 9 in the third schematic spectrum 905, are to symbolize the correct position of a broadband signal without exceeding the zone boundaries on the one hand. On the other hand, a frequency inversion, which is associated with the sub-sampling, can be recognized with the conversion into the base band in the case of sub-sampled signals, which are within a frequency zone, which is even here. The effect of the frequency inversion can be without significance for the position sensor 100 discussed here or for a position/angle sensor, because the AM modulated ZF signal, viewed spectrally, is always symmetrical. According to the theory, there is no limitation with regard to the level of the sub-sampling towards higher frequencies in response to an ideal sampling. A direct sub-sampling of the double side band AM, which is in HF position, can also be carried out by means of the first electric signal or a carrier signal. A previously conducted frequency conversion, like the conversion from the first schematic spectrum 901 into the second schematic spectrum 903, can then be omitted. The signal in HF position can be converted directly into the digital base band by means of sub-sampling. When using the sub-sampling method, however, numerous limitations must often be considered:

The analog part of the sampler and analog-digital converter 503 can be embodied to process the input frequencies, which are significantly higher in parts in response to sub-sampling, in an error-free manner. In the case of analog-digital converters, which are not explicitly designated for sub-sampling, this is often not fulfilled.

Jitters of the sampling cycle can lead to a reduction of the effective triggering of the analog-digital converter 503. When using the sub-sampling, this can be considered in particular, because the message signal is processed here with a multiple harmonic of the sampling cycle, which, in turn, can also have a multiple of the original jitter. As a result, a sensitive reduction of the effective resolution can be associated therewith or, in other words, the dynamic range can be limited.

As already specified above, a limitation of the message signal to a sub-sampling zone can be carried out for the destruction-free use of the sub-sampling method. With an increasing sub-sampling factor, as in the case of a higher sub-sampling zone than in the third schematic spectrum 905, an alias band filter can be more inefficient and more cost-intensive than a comparable analog filter. This is so, because the width of the zone range is always $f_s/2$, regardless of the level of the sub-sampling.

Due to the above-described limitations, a sub-sampling factor of between 1 and 2 can preferably be chosen, whereby the signal to be sampled typically appears in the frequency zone 2 to 3 in the third schematic spectrum 905 in FIG. 9.

Figure 10:
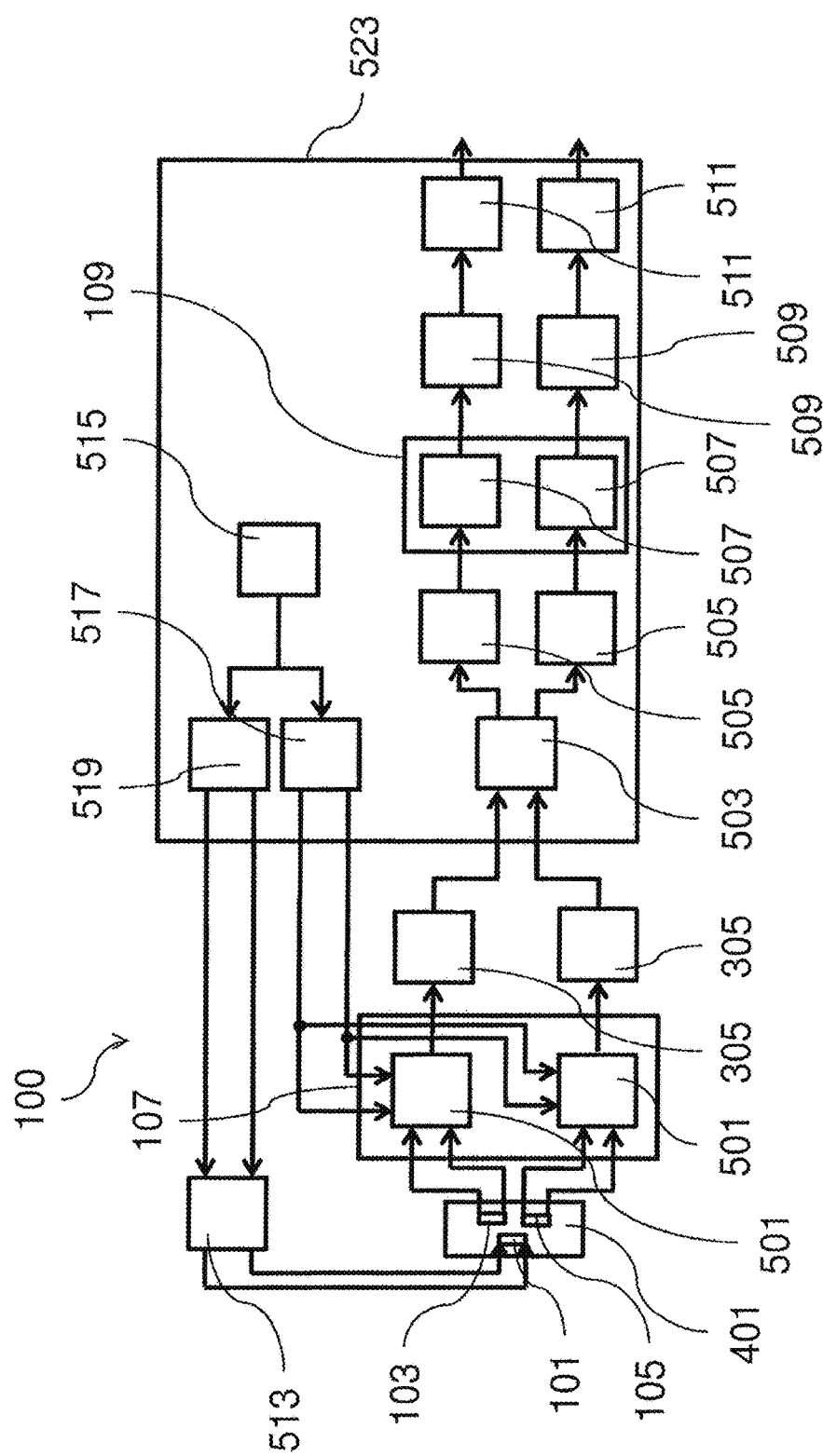
FIG. 10 shows a schematic illustration of the position sensor according to a further embodiment.

FIG. 10 shows a schematic illustration of the position sensor 100 according to a further embodiment. The embodiment of the position sensor 100 shown in FIG. 10 only differs from the embodiment of the position sensor 100 shown in FIG. 5 by an omission of the synthesizer 521. The timer 517 can also be embodied for outputting the second electric signal, for example with the frequency $f_{LO}$.

FIG. 10 also illustrates the functional groups of the position sensor 100, such as of an inductive position sensor, the analog-digital converter 503 of which is able to further process the first ZF, such as the AM signal on ZF-plane, digitally in a sub-sampled manner here. In the mode of operation, it is oriented on principle on the block diagram of the principle illustrated in FIG. 5.

FIG. 10 also shows a block diagram of the position sensor 100, such as of a high-frequency position sensor, with frequency conversion and subsequent digital signal demodulation. A very simple generation of carrier and LO frequency can be attained by means of sub-sampling.

According to an embodiment, all of the external frequencies can be generated by the timers 517, 519, which are integrated in the microcontroller 523.

According to a further embodiment, similarly demanding requirements, as have been specified above, can be made with regard to the generated carrier and local oscillator frequencies and the reference thereof to further internal frequencies by means of the Goertzel algorithm, which is similarly used herein, as AM demodulator so as to avoid errors. Exemplary demands for the frequency processing in response to sub-sampling is provided by:

Carrier frequency range: 1.5 MHz<$f_T$<6 MHz.

ZF range, such as position of the first ZF $f_{ZF1}$: $f_{ZF1}$<200 kHz, preferably: $f_{ZF1}$<100 kHz.

All of the frequencies involved in the signal processing process can be derived from a central time base. The rigid frequency coupling also allows the Goertzel filter 507 to act as filter, which runs in a ZF-synchronous manner again here.

Main switching frequency of the master oscillator 515: $f_{mc}$=24 MHz.

According to a further embodiment, further or adapted demands can furthermore exist, which ensure a disruption-free operation, specifically when using the sub-sampling method:

Similarly as described above, the sampling frequency $f_s$ can represent an integral multiple of the ZF frequency, here specifically of the second ZF $f_{ZF2}$ or of the interpreted frequency. Due to the fact that the significant frequency for the digital signal processing in response to the sub-sampling method, on which the parameters to be adjusted can orientate themselves, is $f_{ZF2}$, the correct dimensioning also ensures here that the carrier, which is converted into the second ZF position, can always coincide with the center frequency of the pass-band of the Goertzel filter 507.

A further requirement can be provided by the so-called zone symmetry (ZS). As already suggested above, the first ZF frequency $f_{ZF1}$ can be converted centrically into a sub-sampling zone, if possible, as shown in the third schematic spectrum 905. A centric position or the symmetrical distance to the forbidden adjoining zones, respectively, such as alias frequencies resulting therefrom, can mean a maximally possible bandwidth for the message signal, which modulates the ZF carrier, in accordance with the frequency of the sine or cosine envelope. A centric position of $f_{ZF1}$ within the sub-sampling zone furthermore allows for a simpler and thus more cost-efficient design of the analog $f_{ZF1}$ anti-aliasing bandpass filter, which can be less selective than if $f_{ZF1}$ were close to the zone boundary. The zone symmetry can be specified numerically and can thus be predefined, in that the quotient of sampling frequency $f_s$ and of the second ZF frequency $f_{ZF2}$ is formed like an interpreted frequency. What can apply is:

$$ZS = \frac{f_s}{f_{ZF2}},$$

$ZS \in \mathbb{N}$. In the subsequent dimensioning of the frequencies, which are involved, ZS can take the values 3, 4 or 5. For example, ZS=4 represents an optimum with zone-centered position of $f_{ZF1}$, while ZS=3 or ZS=5 identifies the first ZF with slight center offset within the zone range. These values can be permitted so as not to allow the number of usable results to become too small in response to the subsequent search for matching frequency combinations.

According to a further embodiment, the dimensioning of the high-frequency position sensor can be made on the basis that the first frequency or carrier frequency $f_T$ for the primary control as well as the second frequency or overlap frequency $f_{LO}$ of the local oscillator are generated by means of the internal timers 517, 519 of the microcontroller 523. To check whether this assumption is sensible, all possible frequency combinations can be queried by means of a systematic search procedure based on the demands made above. An optimal $f_{ZF1 \leftrightarrow} f_s$ combination can be determined hereby. So as not to limit the number of the possible solutions unnecessarily here, all of the sampling frequencies $f_s$, which can be adjusted specifically, of the used analog-digital converter, can be permitted.

For example, the parameters are chosen as follows so as to provide for an efficient operation of the position sensor 100:

Carrier frequency $f_T$=1.5 MHz=$f_{mc}$/16; local oscillator frequency $f_{LO}$≈1.412 MHz;
First ZF frequency: $f_{ZF1}$≈88.2353 kHz;
Sampling frequency $f_{ZF1}$≈117.647 kHz;
$f_{ZF2}$≈29.411 kHz; and
Zone symmetry ZS=4.

LIST OF REFERENCE NUMERALS

100 position sensor
101 primary coil
103 first secondary coil
105 second secondary coil
107 frequency converter
109 Goertzel filter bank
201 input signal
203 output signal
301 carrier oscillator
303 local oscillator
305 selective intermediate frequency amplifier
401 circuit board
403 position transmitter
405 coil
407 capacitor
501 mixer
503 analog-digital converter
505 device for signal windowing
507 Goertzel filter
509 device for linearization
511 signal output
513 amplifier
515 master oscillator
517 timer
519 timer
521 synthesizer
523 microcontroller
701 Phase detector
703 Loop filter
705 Voltage-controlled oscillator
707 Flip-flop
709 Frequency divider
801 Selective limiter-amplifier
803 Selective limiter-amplifier
901 First schematic spectrum
903 Second schematic spectrum
905 Third schematic spectrum

The invention claimed is:

1. A position sensor for detecting a position of a position transmitter, wherein the position sensor is connected to a first electric signal source in order to output a first electric signal with a first frequency and to a second electric signal source in order to output a second electric signal with a second frequency, comprising:
   a primary coil for generating an alternating magnetic field with the first frequency;
   a first secondary coil and a second secondary coil, wherein the first secondary coil and the second secondary coil are each magnetically coupled to the primary coil by the position transmitter, and wherein a third electric signal is induced in the first secondary coil and a fourth electric signal is induced in the second secondary coil by the generated alternating magnetic field;
   a frequency converter for converting the third electric signal into a first intermediate frequency signal and for converting the fourth electric signal into a second intermediate frequency signal, wherein the frequency converter is connectable to the second electric signal source; and
   a Goertzel filter bank for the demodulation of the first intermediate frequency signal in order to obtain a first demodulated signal, and for the demodulation of the second intermediate frequency signal in order to obtain a second demodulated signal.

2. The position sensor as claimed in claim 1, further comprising a processor for determining the position of the position transmitter as a function of the first demodulated signal or of the second demodulated signal.

3. The position sensor as claimed in claim 2, wherein an analog-digital converter is connected upstream of the Goertzel filter bank.

4. The position sensor as claimed in claim 1, wherein an analog-digital converter is connected upstream of the Goertzel filter bank.

5. The position sensor as claimed in claim 1, wherein a device for signal windowing is connected upstream of the Goertzel filter bank.

6. The position sensor as claimed in claim 1, wherein the Goertzel filter bank comprises a first Goertzel filter for the demodulation of the first intermediate frequency signal and a second Goertzel filter for the demodulation of the second intermediate frequency signal.

7. The position sensor as claimed in claim 1, further comprising a signal output for outputting the first demodulated signal or the second demodulated signal.

8. The position sensor as claimed in claim 1, wherein a device for linearizing the first demodulated signal or the second demodulated signal is connected downstream from the Goertzel filter bank.

9. The position sensor as claimed in claim 1, wherein a bandpass filter is connected downstream from the frequency converter.

10. The position sensor as claimed in claim 1, wherein an amplifier is connected downstream from the frequency converter.

11. The position sensor as claimed in claim 1, wherein the frequency converter comprises a first mixer for mixing the third electric signal with the second electric signal, and a second mixer for mixing the fourth electric signal with the second electric signal.

12. The position sensor as claimed in claim 1, further comprising the first electric signal source and the second electric signal source.

13. The position sensor as claimed in claim 12, wherein an amplifier is connected downstream from the first electric signal source or the second electric signal source.

14. The position sensor as claimed in claim 13, further comprising a frequency generator for generating a further electric signal with a third frequency, wherein the first electric signal source is embodied to generate the first electric signal on the basis of thefurther electric signal, and wherein the second electric signal source is embodied to generate the second electric signal on the basis of the further electric signal.

15. The position sensor as claimed in claim 12, further comprising a frequency generator for generating a further electric signal with a third frequency, wherein the first electric signal source is embodied to generate the first electric signal on the basis of the further electric signal, and wherein the second electric signal source is embodied to generate the second electric signal on the basis of the further electric signal.

16. The position sensor as claimed in claim 15, wherein the first frequency or the second frequency is an integral multiple of the third frequency, or wherein the third frequency is an integral multiple of the first frequency or of the second frequency.

17. The position sensor as claimed in claim 16, wherein the first electric signal source comprises a synthesizer for generating the first electric signal with the first frequency on the basis of the further electric signal, or wherein the second electric signal source comprises a synthesizer for generating the second electric signal with the second frequency on the basis of the further electric signal.

18. The position sensor as claimed in claim 15, wherein the first electric signal source comprises a synthesizer for generating the first electric signal with the first frequency on the basis of the further electric signal, or wherein the second electric signal source comprises a synthesizer for generating the second electric signal with the second frequency on the basis of the further electric signal.

* * * * *